United States Patent [19]

Opperman et al.

[11] 4,453,334
[45] Jun. 12, 1984

[54] FISHING LURE

[76] Inventors: Paul Opperman, 5 N. Franklin, New Bremen, Ohio 45869; Roger H. Liette, Rte. 2, Box 184, St. Marys, Ohio 45885

[21] Appl. No.: 352,016

[22] Filed: Feb. 24, 1982

[51] Int. Cl.³ .............................................. A01K 85/00
[52] U.S. Cl. .................................. 43/42.13; 43/42.11; 43/42.49
[58] Field of Search .................... 43/43.13, 42.1, 42.11, 43/42.26, 42.36, 43.15, 44.9, 42.49; D22/27

[56] References Cited

U.S. PATENT DOCUMENTS

| | | | |
|---|---|---|---|
| 3,137,085 | 6/1964 | Swenson | 43/42.49 |
| 3,143,824 | 8/1964 | Thomas | 43/42.26 |
| 3,996,688 | 12/1976 | Hardwicke | 43/42.11 |
| 4,011,681 | 3/1977 | Johnson | 43/42.11 |
| 4,033,065 | 7/1977 | Shannon | 43/42.13 |
| 4,209,932 | 7/1980 | Pate | 43/42.13 |
| 4,329,804 | 5/1982 | Brown | 43/42.13 |

Primary Examiner—Gene P. Crosby
Attorney, Agent, or Firm—John J. Byrne; Bradford E. Kile; Kevin M. O'Brien

[57] ABSTRACT

Disclosed is a fishing lure designed so that the fishing line passes through an aperture in a spinner support wire which connects the body to the spinner before passing through or being attached to the body. The aperture acts as a pivot point, and variations in tension in the fishing line cause the body and the spinner to pivot about the aperture.

8 Claims, 2 Drawing Figures

FIG. 1 PRIOR ART
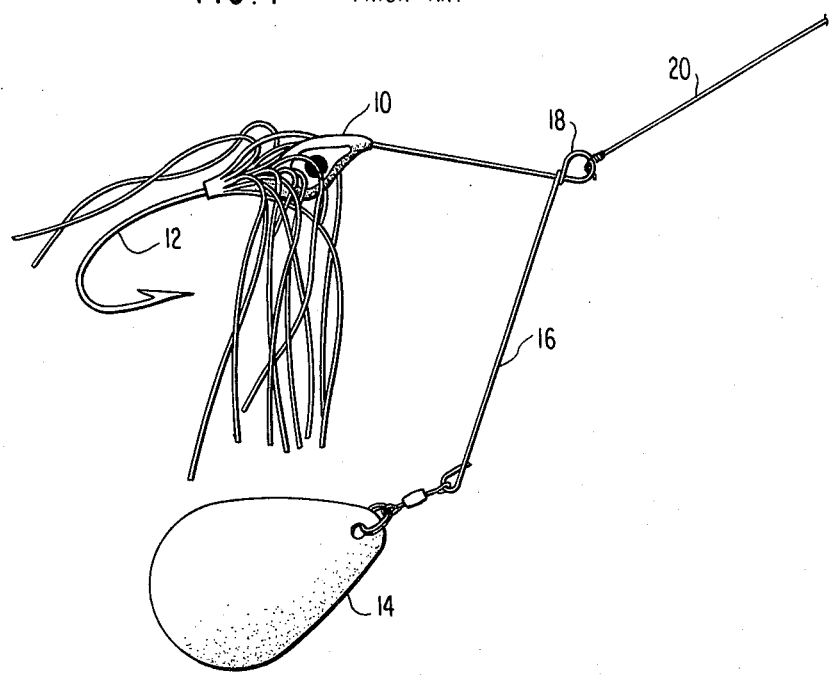
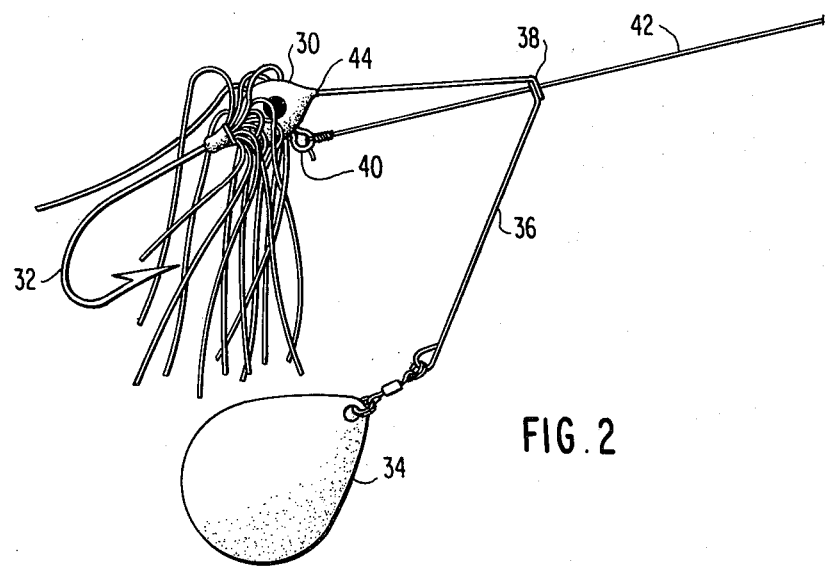
FIG. 2

FISHING LURE

FIELD OF THE INVENTION

This invention is an improvement in fishing lures of the type comprising a body, a hook carried by the body, a spinner, and a spinner support wire connecting the spinner to the body.

BACKGROUND OF THE INVENTION

The fishing lure shown in FIG. 1 is exemplary of some lures of the prior art. Fishing lures of this type normally have a body 10, a hook 12 carried by the body 10, a spinner 14, and a spinner support wire 16 connecting the spinner 14 to the body 10. In the lure shown, the support wire 16 is formed with an eyelet 18. A fishing line 20 is attached to or passed through the eyelet 18. In this configuration, the body 10 and the spinner 14 flops about, pivoting randomly about the eyelet 18 in response to currents in the water. The fishing lure can be pulled linearly through the water by the fishing line 20. As this action occurs, however, the pivoting motions of the body 10 and the spinner 14, which motions are of prime importance in attracting fish, are relatively unaffected by variations in tension in the fishing line 20— that is, by the actions of the fisherman in pulling on and relaxing the fishing line.

OBJECT OF THE INVENTION

It is a principal object of this invention to provide a fishing lure in which variations in tension in the fishing line cause pivoting motion of the lure body and the spinner.

It is a further object of this invention to provide such a fishing lure which is inexpensive to manufacture and sturdy in use.

SUMMARY OF THE INVENTION

The invention is a fishing lure designed so that the fishing line passes through an aperture in a spinner support wire which connects the body of the lure to the spinner before passing through or being attached to the body of the lure. The aperture acts as a pivot point, and variations in tension in the fishing line cause the body and the spinner to pivot about the aperture.

BRIEF DESCRIPTION OF THE DRAWINGS

FIG. 1 is a side view of a prior art fishing lure.
FIG. 2 is a side view of a fishing lure according to this invention.

DETAILED DESCRIPTION OF THE PRESENTLY PREFERRED EMBODIMENT

The fishing lure shown in FIG. 2 comprises a body 30, a hook 32 carried by the body 30, a spinner 34, and a spinner support wire 36 connecting the spinner 34 to the body 30. The spinner support wire 36 is formed into an eyelet 38, and another eyelet 40 is carried by the body 30. Alternatively, the eyelet 40 can be replaced by an aperture formed directly in the body 30 and the eyelet 38 can be replaced by a ring connected by arms to the body 30 and the spinner 34. A ring or the illustrated one-and-a-half counterclockwise (looking down into the vertex of the spinner support wire 36) turns in the wire are useful in preventing the fishing line from becoming disengaged from the fishing lure, since it is possible for an eyelet formed from a clockwise turn to unwrap under severe stress, allowing the line to disengage.

A fishing line 42 is passed through the eyelet 38 and either passes through or is attached to the eyelet 40. In either case, the eyelet 38, the eyelet 40, and the point 44 where the spinner support wire 36 is attached to the body 30 can be thought of as the vertices of a triangle the sides of which are a portion of the fishing line 42, a portion of the spinner support wire 36, and a portion of the body 30 of the lure. The eyelet 38 acts as a pivot point, and variations in tension in the line 42 cause the body 30 and the spinner 34 to pivot about the eyelet 38.

Preferably, and as shown, the spinner support wire is bent into an acute angle with the eyelet 38 at the vertex of the acute angle. Similarly, the length of the spinner support wire 36 between the point 44 and the eyelet 38 and between the eyelet 38 and the spinner 34 is at least as long as (and preferably several times as long as) the longest dimensions of the body 30 and the spinner 34. Since the body 30 and the spinner 34 pivot about the two arms of the spinner support wire, making the arm long relative to the body 30 and the spinner 34 ensures good "action" of the body 30 and the spinner 34.

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

We claim:

1. A fishing lure comprising:
   a body;
   a hook carried by said body;
   a projection connected to said body at a first point and having a line-receiving aperture therein at a second point spaced from said first point;
   an eyelet on said body and operable to receive a fishing line at a third point spaced from said first and second points so that upon attachment of a fishing line through said line-receiving aperture and to said eyelet, a three sided figure is formed wherein the eyelet and a portion of the body form one side, a portion of the projection and a portion of the body form a second side, and a portion of the fishing line extending through the line-receiving aperture and to the eyelet form a third side; and
   a spinner connected to said projection, whereby variations in tension in the fishing line will cause said body to pivot about said line-receiving aperture.

2. A fishing lure as recited in claim 1 wherein said hook is rigidly fixed to said body.

3. A fishing lure as recited in claim 1 wherein said projection is rigidly fixed to said body.

4. A fishing lure as recited in claim 1 wherein said eyelet is rigidly fixed to said body.

5. A fishing lure as recited in claim 1 wherein said projection is formed from a piece of wire which is bent to form said line-receiving aperture and which extends beyond said line-receiving aperture, said spinner being attached to said projection at a point on the opposite side of said line-receiving aperture from said body.

6. A fishing lure as recited in claim 5 wherein said piece of wire is bent into an acute angle with said line-receiving aperture at the vertex thereof.

7. A fishing lure as recited in claim 1 wherein said first, second and third points form the corners of said three sided figure.

8. A fishing lure as recited in claim 1 wherein said projection is bent into a V-shaped with said body and said spinner at the ends of the legs of the V, and said line receiving aperture when looking down into the V, is formed at least one-and-a-half counterclockwise turns of the projection.

* * * * *